US005569904A

United States Patent [19]
Meyers

[11] Patent Number: 5,569,904
[45] Date of Patent: Oct. 29, 1996

[54] MULTISPOT AUTOFOCUS SYSTEM HAVING A RADIATION EMITTER WHICH EMITS RADIATION THAT IS DIVIDED INTO A PLURALITY OF DISCRETE BEAMS

[75] Inventor: Mark M. Meyers, Hamlin, N.Y.

[73] Assignee: Eastman Kodak Company, Rochester, N.Y.

[21] Appl. No.: 277,151

[22] Filed: Jul. 19, 1994

[51] Int. Cl.[6] ........................................ G01J 1/20
[52] U.S. Cl. ............................. 250/201.8; 396/111
[58] Field of Search ................. 250/201.7, 201.6, 250/201.8, 216, 201.5; 354/403, 402, 412, 442, 408; 359/21, 22, 28, 15, 17, 27; 356/347, 371, 1, 4, 3; 136/206

[56] References Cited

U.S. PATENT DOCUMENTS

| | | | |
|---|---|---|---|
| 3,442,193 | 5/1969 | Pagel | 95/44 |
| 3,659,914 | 5/1972 | Brooks | 356/347 |
| 4,204,881 | 5/1980 | McGrew | 136/206 |
| 4,367,934 | 1/1983 | Matsui | 354/25 |
| 4,429,967 | 2/1984 | Tokuda et al. | 354/403 |
| 4,523,828 | 6/1985 | Kato | 354/403 |
| 4,575,211 | 3/1986 | Matsumura et al. | 354/403 |
| 4,623,237 | 11/1986 | Kaneda et al. | 354/403 |
| 4,748,469 | 5/1988 | Tamura | 354/403 |
| 4,827,302 | 5/1989 | Takahashi | 354/403 |
| 4,862,442 | 8/1989 | Tadokoro et al. | 369/45 |
| 4,874,239 | 10/1989 | Tamura | 354/403 |
| 4,935,613 | 6/1990 | Ishiguro et al. | 250/201.1 |
| 4,945,529 | 7/1990 | Ono et al. | 369/109 |
| 5,016,954 | 5/1991 | Onayama et al. | 250/201.1 |
| 5,039,183 | 8/1991 | Meyers | 359/17 |
| 5,070,509 | 12/1991 | Meyers | 372/45 |
| 5,137,350 | 8/1992 | Misawa et al. | 356/1 |
| 5,156,139 | 11/1992 | Inoue et al. | 369/44.23 |
| 5,189,463 | 2/1993 | Capper et al. | 354/403 |
| 5,212,375 | 5/1993 | Goto et al. | 250/201.7 |
| 5,212,572 | 5/1993 | Krantz et al. | 359/15 |
| 5,245,596 | 9/1993 | Gupta et al. | 250/201.5 |
| 5,264,892 | 11/1993 | Nonaka et al. | 354/403 |
| 5,305,047 | 4/1994 | Hayakawa et al. | 354/403 |

FOREIGN PATENT DOCUMENTS

| | | |
|---|---|---|
| 0518012A1 | 12/1992 | European Pat. Off. . |
| 2239760 | 7/1991 | United Kingdom . |
| WO93/13452 | 7/1993 | WIPO ............ G03B 13/02 |

OTHER PUBLICATIONS

Sweatt, W. C.—"Designing and constructing thick holographic optical elements", Applied Optics vol. 17 No. 8, 15 Apr. 1978, pp. 1220–1227.

*Primary Examiner*—Que T. Le
*Attorney, Agent, or Firm*—David A. Howley

[57] ABSTRACT

A multispot autofocus system, usable with a camera, includes a radiation emitter for emitting visible or infrared radiation. The radiation is divided into at least three discrete beams of radiation by one or more holographic and/or diffractive optical elements. The beams of radiation are directed to different areas of a scene to be recorded. An amount of radiation reflected from the scene is measured. A correct focus position of an optical system of the camera is determined based on the amount of radiation reflected from the scene which is measured.

9 Claims, 3 Drawing Sheets ated application. and (b) are assigned to the assignee of this
MULTISPOT AUTOFOCUS SYSTEM HAVING A RADIATION EMITTER WHICH EMITS RADIATION THAT IS DIVIDED INTO A PLURALITY OF DISCRETE BEAMS

FIELD OF THE INVENTION

The invention relates generally to the field of image recording apparatus and, in particular, to cameras. More specifically, the invention relates to a multispot autofocus system usable with an image recording apparatus.

CROSS-REFERENCE TO RELATED APPLICATIONS

Reference is made to commonly assigned copending application Ser. Nos. 08/245,993, 08/250,067 and 08/201, 597, each of which (a) was filed in the name of Mark Meyers and (b) are assigned to the assignee of this application.

BACKGROUND OF THE INVENTION

U.S. Pat. No. 5,305,047 (the '047 patent) discloses a compact light projection system for autofocus detection apparatus in which a stripe pattern is projected onto an object in a wide range. The light projection device includes a chart having a pattern to be detected, an illuminating device for illuminating the chart, and a lens assembly for projecting the pattern. The lens assembly includes a first lens having an optic axis and second and third lenses having optic axes respectively inclining at a predetermined angle to the optic axis of the first lens.

A problem with the light projection system of the '047 patent is that it uses a light emitting diode 3 (LED) as the illuminating device. Radiation emitted from an LED does not remain collimated as it emanates away from the LED. As a result, the LED radiation rapidly diffuses and therefore becomes progressively less effective in an active autofocus system as the distance increases between the image capture apparatus and the scene whose image is to be captured. A further problem is that LED 3 appears to emit infrared radiation (col. 1, 32–34) which is not visible to the unaided human eye. As such, a camera operator will not be able to tell which part of the scene the camera is focusing on.

A further problem with the '047 patent is that there will be knife-edge diffraction and scattering from the sectioning of the emitter lens which will reduce the contrast of the reflected pattern. Also, the subsectioned emitter lens does not produce beams having the same cross-section and/or intensity.

SUMMARY OF THE INVENTION

The present invention is directed to overcoming one or more of the problems set forth above. Briefly summarized, according to one aspect of the present invention, a multispot autofocus system, usable with an image recording apparatus, includes a laser radiation emitter for emitting laser radiation. The laser radiation is divided into at least three discrete beams of laser radiation which are directed to different areas of a scene to be recorded. An amount of laser radiation reflected from the scene is measured.

Beams of laser radiation remain highly collimated as they travel through space, thereby maintaining there effectiveness in an active autofocus system even when the distance between the camera and scene becomes great. In a preferred embodiment of the invention, visible radiation is used. As such, a camera operator will be able to see which portions of the scene the camera is focusing on.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
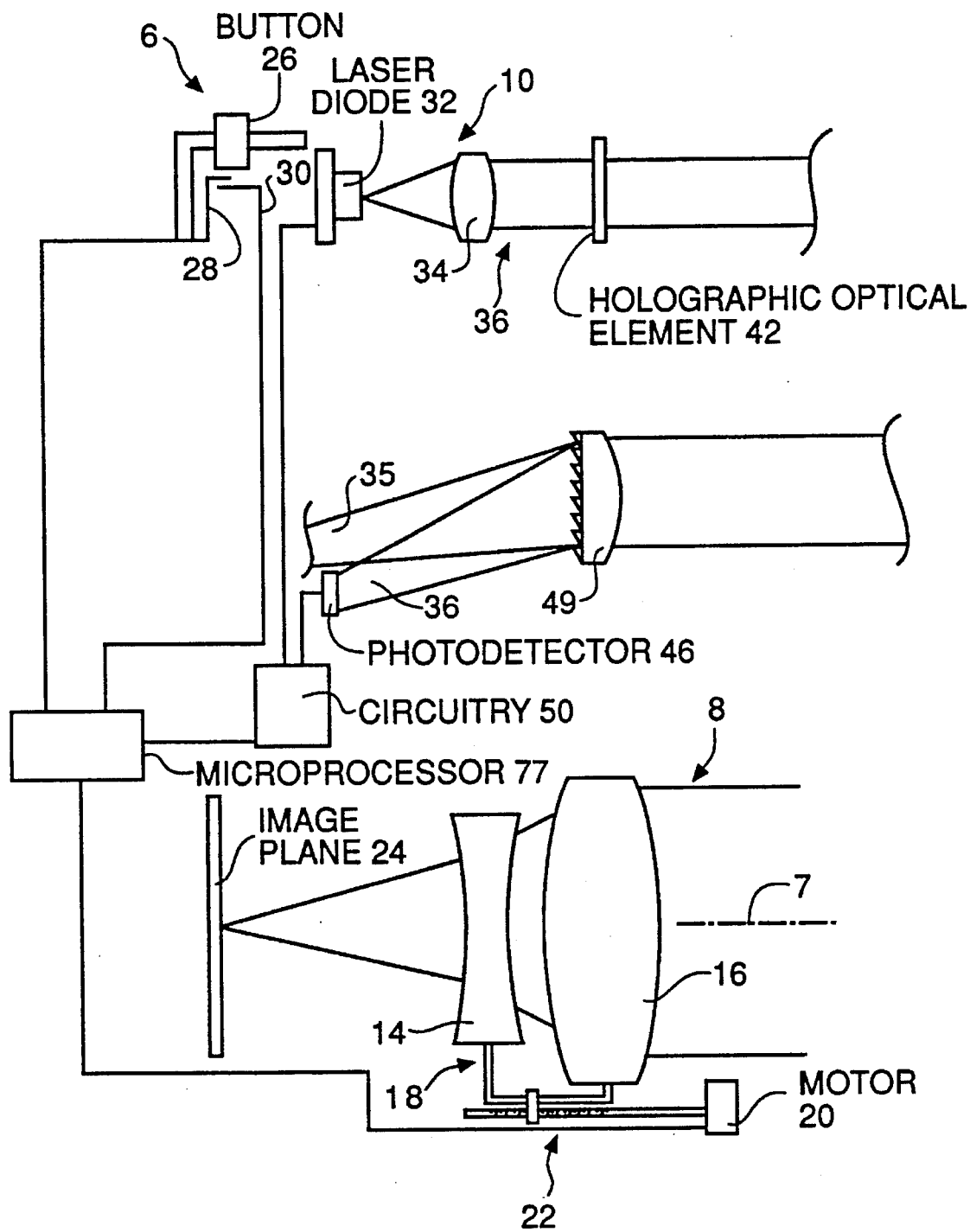
FIG. 1 is a schematic representation of part of a camera including a multispot autofocus system.

Referring now to FIG. 1, a preferred embodiment of the invention is illustrated in a camera 6 including a multispot autofocus system 10. The camera has an optical axis 7, is automatic in its operation, and is actuated by a button 26 that is depressed to move through two positions engaging first and second switches 28 and 30, respectively. The first switch 28, connected to a camera microprocessor 77, activates the autofocus system which emits visible or infrared radiation beams used in focusing the camera's optical system. If visible radiation is emitted, a camera operator will be able to determine what portion of a scene the camera is focused on. Visible radiation also allows the camera operator to not look through a camera viewfinder to aim the camera. The second switch 30 activates a camera exposure operation to record an image.

A surface or side emitting laser diode 32 is depicted as the radiation emitter in the preferred embodiment. A collimating lens 34 is used to collimate the laser light emitted from laser diode 32. The laser is preferably driven at one-half of a milliwatt (½ mw) and is modulated at one kilohertz (1 khz). The combination laser and lens projects a narrow beam of radiation 36 in wavelengths in the visible or infrared spectrum, with a bandwidth of approximately one to twenty nanometers (1–20 nm).

A volume holographic optical element (HOE) 42 is utilized to diffract beam 36 into three discrete beams which diverge from each other. The discrete beams diverge into and out of the plane of FIG. 1 and are better viewed in FIG. 2. The discrete beams preferably have substantially similar crossections and intensities, thereby allowing a uniform accuracy of distance detection across the left, center and right portions of the scene. A diffractive optical element may be used in place of HOE 42. These three beams reflect off of various features in a scene to be recorded and return to a pair of photodetectors 44, 46 (44 is hidden from view). Photodetectors 44,46 convert the light energy into electrical signals, which, when analyzed by microprocessor 77 and associated circuitry 50, indicate a correct focus position for the camera's objective lens system.

An imaging system 8, conventional in design, includes a lens assembly 14 and 16 defining a camera objective 18. The objective 18 is adjustable by a stepper motor 20 and linkage 22 that move the objective axially, in either direction, to properly focus an image on plane 24 in response to commands from the camera's microprocessor. Although not specifically shown, the image plane 24 is defined by conventional and well known structure that locates a frame of photographic film or an optoelectronic sensor in a position for exposure to the focused image. Circuitry 50 determines both the direction and magnitude of adjustment required to properly focus the objective 18 and signals a stepper motor 20 to move objective 18 to the correct position.

The properties and methods of manufacturing holographic optical elements of the type used in the preferred embodiment are known in the prior art. Examples include the disclosure in my U.S. Pat. No. 5,039,183, issued Aug. 13, 1991; and an article entitled "Designing and Constructing Thick Holographic Optical Elements," published in Applied Optics, Volume 17, Number 8, dated Apr. 15, 1978. The disclosures of the last mentioned patent and publication hereby are incorporated by reference into this specification.

HOE 42 can be formed holographically in volume holographic materials such as dichromated gelatin, in surface relief materials such as photoresist or they can be formed using a microlithographic type patterning and etching process (called binary or diffractive elements in the literature). The diffractive elements can also be formed as masters which are then used to replicate or injection mold production quantities of parts.

Figure 2:
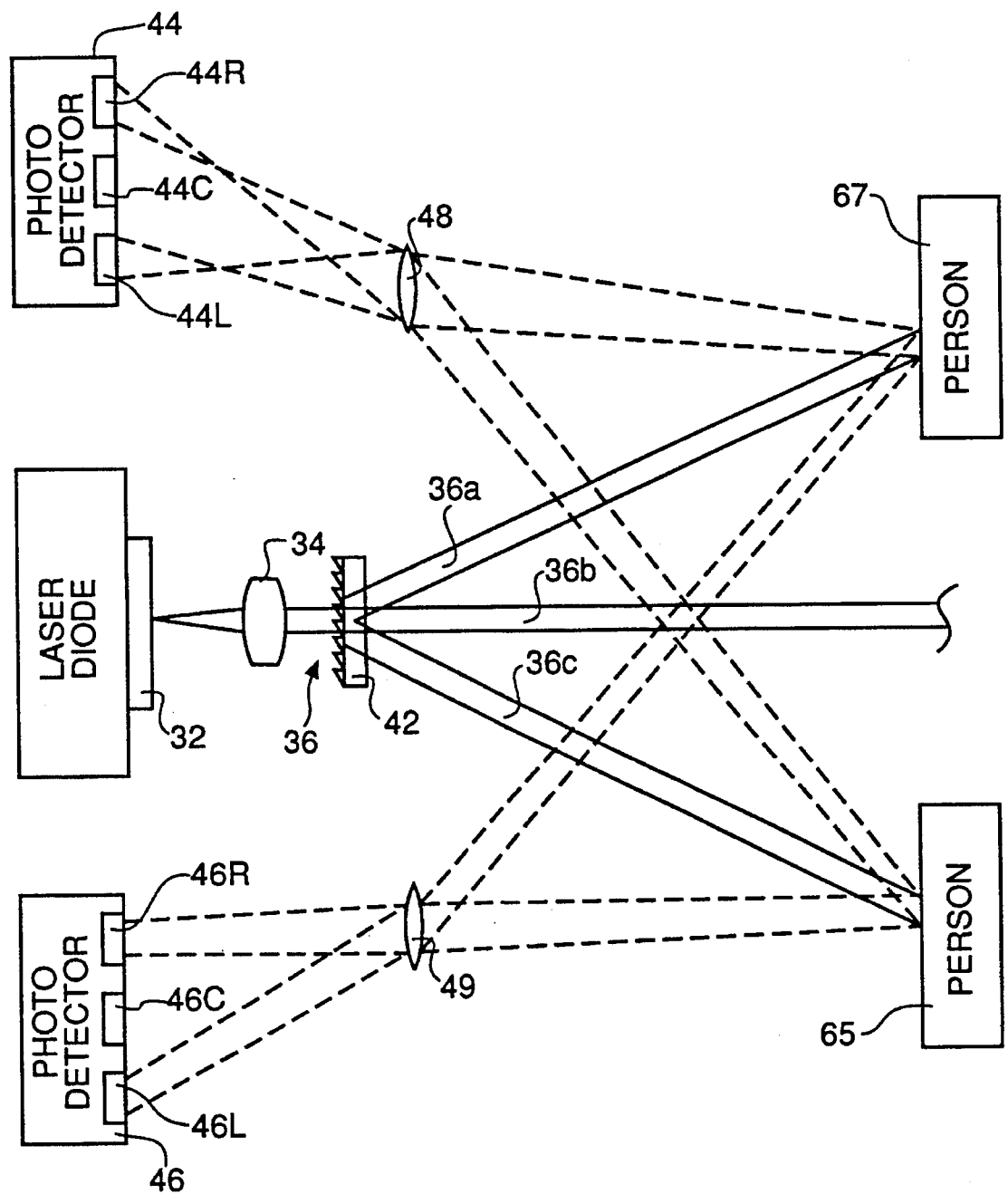
FIG. 2 is a schematic representation of the multispot autofocus system of FIG. 1 illuminating a scene.

Referring to FIG. 2, as described earlier, light beam 36 is divided into three discrete beams 36a–c which diverge from each other as they propagate away from HOE 42. In this case, beams 36a–c are directed towards a scene having two persons, represented by blocks 65,67, standing next to each other. Beam 36b does not strike anything in the scene and continues to propagate with none of it's light being reflected back to photodetectors 44,46. Light beams 36a and c reflects off persons 67 and 65 respectively.

A portion of the reflected light from each beam passes through a pair of lenses 48, 49. Lenses 48, 49 preferable included a plastic lens with a diffraction grating molded on the back. Lenses 48 and 49 both spectrally disperse and focus the light passing through them. As shown in FIG. 1, lenses 48, 49 (48 is hidden from view) diffract the radiation 36 emitted from laser diode 32 and reflected from the scene onto photodetector 46. Radiation 35 incident on lenses 48, 49 which is of wavelengths different from that emitted from laser diode 32 is diffracted such that it does not fall on photodetector 46.

Referring to FIG. 2, lenses 48 and 49 have different focal lengths, lens 48 imaging the designator beam in front of its photodetector 44 and lens 49 imaging the designator beam behind its photodetector 46. Each photodetector includes three photodiodes designated respectively 44R, 44C, 44L and 46R, 46C, 46L. Lenses 48,49 and photodetectors 44,46 are designed and positioned such that reflected light from beam 36a falls on photodiodes 44L and 46L, reflected light from beam 36b would fall on photodiodes 44C and 46C and reflected light from beam 36c falls on photodiodes 44R and 46R.

Each photodiode outputs an electrical current dependent on the amount of light which falls on the photodiode. The more light which falls on the photodiode, the higher the current output by the photodiode. In this case, photodiodes 46L, 46R, 44L and 44R will all produce about the same amount of current while photodiodes 44C and 46C will produce only a dark current.

Figure 3:
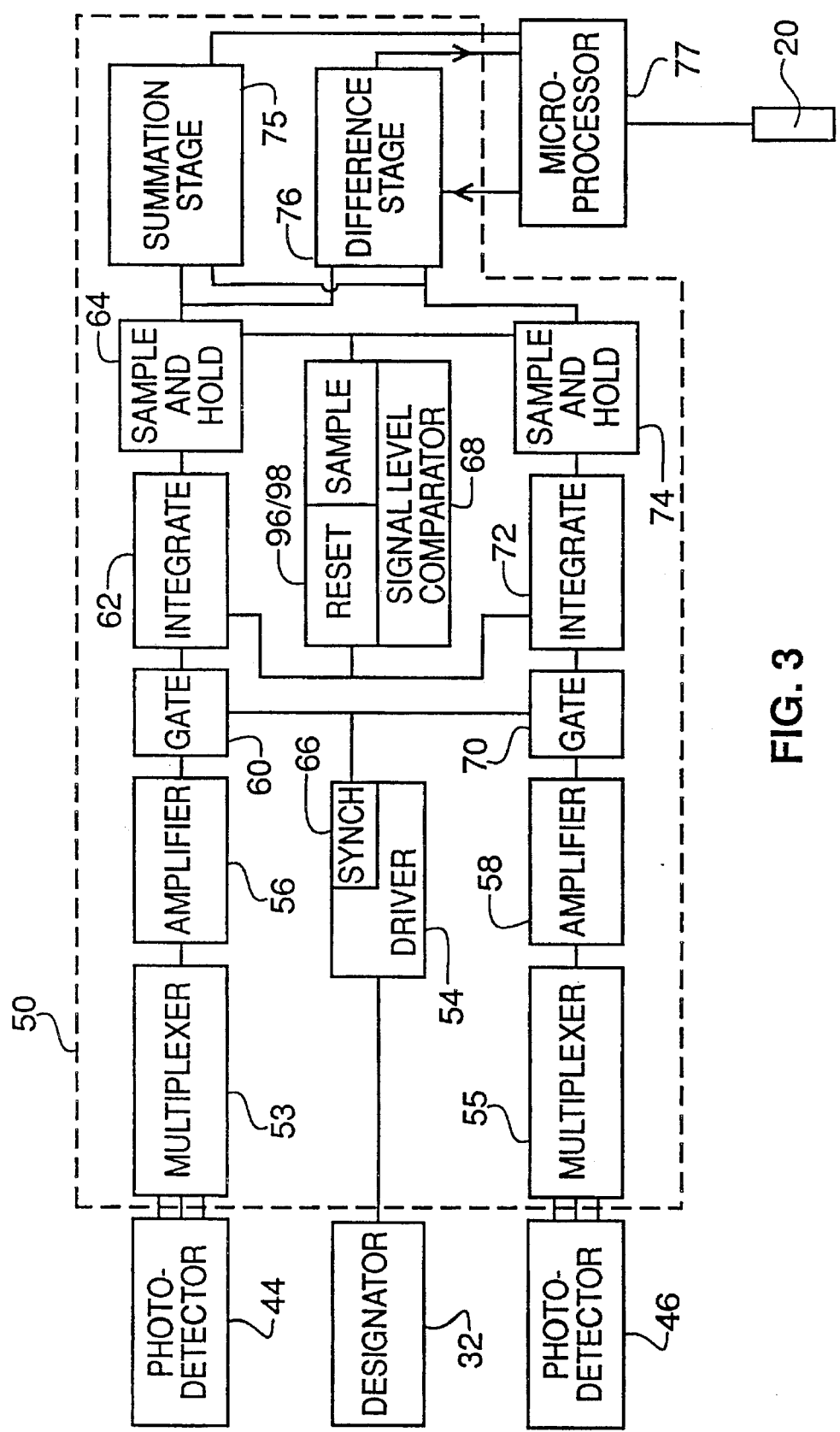
FIG. 3 is a block diagram of a circuit used to determine a correct focus position of a camera optical system.

FIG. 3 is a block diagram of an electrical circuit used with the multispot autofocus system. A driver 54 powers and modulates the laser diode 32 at a frequency of one kilohertz (1 khz). The output signals from the three photodiodes in each photodetector are combined respectively by multiplexers 53, 55. The signals output by the multiplexers are amplified at 56 and 58, respectively, and processed in separate channels for comparison. Using the first channel for this description, the amplified signal of photodetector 44 is gated at 60 to an integrator 62 and a sample and hold circuit 64. Gating is controlled by a synchronizer 66, coupled to designator driver 54, so the duty cycle or integrating period of integrator 62 is matched to the on period of the laser designator 32. Noise is reduced, and the signal-to-noise ratio increased, by integrating the amplified photodetector signal only when the laser designator is on.

Integration of the amplified signal continues over many pulses of the laser until the integrated value in either channel reaches some predetermined level optimal for processing, such as three volts, determined by comparator 68. It is then saved in the sample and hold circuit 64. At the same time, the integrated signal from the second channel, 46, 55, 58, 70, 72, and 74, is sampled and saved.

The two channels are then compared and summed in a summation stage 75. Summation stage 75 combines the signals from photodiode 44L and 46L, the signals from photodiodes 44C and 46C, and the signals from photodiodes 44R and 46R to provide a combined L(left) signal, R(right) signal and C(center) signal to microprocessor 77. Microprocessor 77 then compares the L, R and C signals to determine which one to use to focus objective 18. The microprocessor will default to the C signal unless the L or R signal is, for example 20% higher than the C signal. In this case, the L and R signals will each be more than 20% higher than the C signal. Now the microprocessor compares the L and R signals and selects the higher of the two signals. For this example, we will assume the L signal is higher than the R signal.

Now microprocessor 77 instructs a difference stage 76 to subtracted signal 44L from signal 46L, and the difference between the signals is provided as an output signal to the microprocessor representing the direction and magnitude of focus adjustment required for the camera objective. The output signal is independent of the absolute illumination from the laser and the reflectivity of the subject. The output voltage can be analog or digital, in the latter case simplifying its application to the microprocessor. Microprocessor 77 then operates motor 20 to move objective 18 to it's in focus position.

While it is preferable to use visible laser radiation, infrared laser radiation can also be used. Such an infrared laser is disclosed in my U.S. Pat. No. 5,070,509, issued Dec. 3, 1991, which hereby is incorporated by reference into the present specification. Also, if the camera is to be used to capture images of objects located two meters or less from the camera, a light emitting diode can be used as the radiation emitter.

While the invention has been described in connection with preferred an alternative embodiments, other modifications and applications will occur to those skilled in the art. The claims should be interpreted to fairly cover all such modifications and applications within the true spirit and scope of the invention.

PARTS LIST FOR FIGS. 1–3

6—Camera.
7—Optical Axis.
8—Imaging system.
10—Autofocus system.
14 & 16—Lens assembly.

18—Objective.
20—Stepper motor.
22—Linkage.
24—Image plane.
26—Actuation button.
28—First switch.
30—Second switch.
31—Laser diode.
34—Collimating lens.
36—Narrow beam.
36a–c—Discrete Beams.
42—Holographic optical element.
44—Photodetector.
46—Photodetector.
48,49—Lenses.
50—Circuitry.
53,55—Multiplexers.
54—Driver.
56,58—Amplifiers.
60—Gate.
62—Integrator.
64—Sample and hold circuit.
65,67—Blocks.
66—Synchronizer.
68—Comparator.
46, 55, 58, 70, 72, 74—Second channel.
75—Summation Stage.
76—Difference stage.
77—Microprocessor.

I claim:

1. A multispot autofocus system, comprising:

a laser radiation emitter for emitting laser radiation;

means for dividing laser radiation into a plurality of discrete beams which are directed to different areas of a scene to be recorded; and means for measuring laser radiation reflected from said scene, said measuring means including a first photodetector and a first lens for focusing laser radiation reflected from said scene at a point in front of said first photodetector such that the radiation passing through the first lens is not focused at the first photodetector, said measuring means also including a second photodetector and a second lens for focusing laser radiation reflected from said scene at a point behind the second photodetector such that the radiation passing through the second lens is not focused at the second photodetector.

2. The multispot autofocus system of claim 1, further comprising:

means for determining a correct focus position of an optical system based on laser radiation reflected from said scene which is measured by said measuring means.

3. The multispot autofocus system of claim 1, wherein said laser radiation emitter emits visible laser radiation.

4. The multispot autofocus system of claim 1, wherein said dividing means includes one or more holographic and/or diffractive optical elements.

5. A multispot autofocus system, comprising:

a radiation emitter for emitting visible or infrared radiation;

means for dividing said visible or infrared radiation into a plurality of discrete beams which are directed to different areas of a scene to be recorded, said plurality of beams having substantially the same cross-section; and means for measuring said visible or infrared radiation reflected from said scene, said measuring means including a first photodetector and a first lens for focusing radiation reflected from said scene at a point in front of said first photodetector such that the radiation passing through the first lens is not focused at the first photodetector, said measuring means also including a second photodetector and a second lens for focusing radiation reflected from said scene at a point behind the second photodetector such that the radiation passing through the second lens is not focused at the second photodetector.

6. The multispot autofocus system of claim 5, wherein said plurality of beams have substantially the same intensity.

7. The multispot autofocus system of claim 5, wherein said dividing means includes a surface relief diffraction grating.

8. The multispot autofocus system of claim 5, wherein said dividing means includes a volume holographic diffraction grating.

9. A multispot autofocus system, comprising:

a radiation emitter for emitting visible or infrared radiation;

means for dividing said visible or infrared radiation into three discrete beams which are directed to a left, center and right area of a scene to be recorded;

a pair of photodetectors each having a left, center and right light detecting portion for detecting radiation reflected from the left, center and right portions of the scene;

a first lens for focusing laser radiation reflected from said scene at a point in front of a first one of said photodetectors such that the radiation passing through the first lens is not focused at the first photodetector;

a second lens for focusing laser radiation reflected from said scene at a point behind the a second one of said photodetectors such that the radiation passing through the second lens is not focused at the second photodetector;

means for summing output signals from the two left detecting portions, the two right detecting portions and the two center detecting portions; and means for determining a distance to a portion of the scene to be focused on based on a highest summed output signal.

* * * * *

UNITED STATES PATENT AND TRADEMARK OFFICE
CERTIFICATE OF CORRECTION

PATENT NO. : 5,569,904
DATED : October 29, 1996
INVENTOR(S) : Mark M. Meyers It is certified that an error appears in the above-identified patent and that said Letters Patent is hereby corrected as shown below:

```
Title page,
item [56] References Cited, line 19, "5,156,139" should read --5,161,139--
```

Signed and Sealed this

Twenty-first Day of October 1997

*Attest:*

BRUCE LEHMAN

*Attesting Officer*  Commissioner of Patents and Trademarks